US012745264B2

(12) United States Patent
Yang et al.

(10) Patent No.: US 12,745,264 B2
(45) Date of Patent: Sep. 22, 2026

(54) METHOD AND DEVICE FOR TRANSMITTING AND RECEIVING SIGNAL IN WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 18/693,929

(22) PCT Filed: Sep. 29, 2022

(86) PCT No.: PCT/KR2022/014618
§ 371 (c)(1),
(2) Date: Mar. 20, 2024

(87) PCT Pub. No.: WO2023/055104
PCT Pub. Date: Apr. 6, 2023

(65) Prior Publication Data

US 2024/0389111 A1 Nov. 21, 2024

(30) Foreign Application Priority Data

Sep. 30, 2021 (KR) ........................ 10-2021-0130204
Oct. 8, 2021 (KR) ........................ 10-2021-0133945

(51) Int. Cl.
*H04W 28/02* (2009.01)
*H04L 1/00* (2006.01)
*H04W 72/232* (2023.01)

(52) U.S. Cl.
CPC ......... *H04W 72/232* (2023.01); *H04L 1/0003* (2013.01)

(58) Field of Classification Search
CPC .. H04W 72/232; H04L 5/0091; H04L 1/0003; H04L 1/009; H04L 1/1819;
(Continued)

(56) References Cited

U.S. PATENT DOCUMENTS 12,568,485 B2 * 3/2026 Park ...................... H04L 1/1854
2021/0329677 A1 * 10/2021 Huang .............. H04W 52/0206
2022/0330301 A1 * 10/2022 Huang .................. H04L 5/0044

FOREIGN PATENT DOCUMENTS

WO 2020261174 12/2020
WO 2021186400 9/2021

OTHER PUBLICATIONS

European Patent Office Application Serial No. 22876876.8, Search Report dated Sep. 10, 2025, 11 pages.
(Continued)

*Primary Examiner* — Phuoc H Doan
(74) *Attorney, Agent, or Firm* — LEE, HONG, DEGERMAN, KANG & WAIMEY

(57) ABSTRACT

According to an embodiment of the present invention, a terminal may receive an N-number of PDSCHs scheduled by a single DCI, and the terminal may determine, on the basis of a first MCS field of the DCI indicating a specific MCS for first TBs of the N-number of PDSCHs and a first RV field of the DCI indicating only a specific RV for all the first TBs of the N-number of PDSCHs, that all the first TBs are disabled for all of the N-number of PDSCHs.

15 Claims, 11 Drawing Sheets

(58) Field of Classification Search
CPC ... H04L 5/0012; H04L 5/0026; H04L 5/0048; H04L 5/0053
See application file for complete search history.

(56) References Cited

OTHER PUBLICATIONS

Moderator (LG Electronics), "Summary #2 of PDSCH/PUSCH enhancements (Scheduling/HARQ)," 3GPP TSG RAN WG1 #105-e, R1-2106105, May 2021, 140 pages.
Intel Corporation, "Discussion on PDSCH/PUSCH enhancements for extending NR up to 71 GHz," 3GPP TSG RAN WG1 #105-e, R1-2104896, May 2021, 9 pages.
3rd Generation Partnership Project (3GPP), "Technical Specification Group Radio Access Network; NR; Physical layer procedures for data (Release 16)," 3GPP TS 38.214 V16.3.0, Sep. 2020, 166 pages.
PCT International Application No. PCT/KR2022/014618, International Search Report dated Jan. 25, 2023, 5 pages.
Ericsson, "PDSCH/PUSCH enhancements," 3GPP TSG-RAN WG1 Meeting #105-e, R1-2104462, May 2021, 26 pages.
Apple Inc., "Discussion on multi-PxSCH and HARQ Codebook Enhancements," 3GPP TSG RAN WG1 #104b-e, R1-2105094, May 2021, 17 pages.
ZTE et al., "Discussion on the PDSCH/PUSCH enhancements for 52.6 to 71GHz," 3GPP TSG RAN WG1 #106-e, R1-2107004, Aug. 2021, 22 pages.
NTT Docomo. Inc., "PDSCH/PUSCH enhancements for NR from 52.6 to 74GHz," 3GPP TSG RAN WG1 Meeting #106-e, R1-2107849, Aug. 2021, 12 pages.

* cited by examiner

1

Home Appliance
100e
IoT device
100f
AI Server/ device
400
Hand-held device
100d
Network (5G)
XR device
100c
Robot
100a
Vehicle
100b-1
Vehicle
100b-2
150a
150b
150c
200
200a
300

METHOD AND DEVICE FOR TRANSMITTING AND RECEIVING SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2022/014618, filed on Sep. 29, 2022, which claims the benefit of earlier filing date and right of priority to Korean Application Nos. 10-2021-0130204, filed on Sep. 30, 2021, and 10-2021-0133945, filed on Oct. 8, 2021, the contents of which are all incorporated by reference herein in their entirety.

TECHNICAL FIELD

The present disclosure relates to a wireless communication system, and more particularly, to a method and apparatus for transmitting/receiving an uplink/downlink wireless signal in a wireless communication system.

BACKGROUND

Generally, a wireless communication system is developing to diversely cover a wide range to provide such a communication service as an audio communication service, a data communication service, and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of receiving a signal by a user equipment (UE) in a wireless communication system. The method may include: receiving, through a single physical downlink control channel (PDCCH), downlink control information (DCI) for scheduling N physical downlink shared channels (PDSCHs); and receiving the N PDSCHs based on the DCI. The DCI may include (i) a first modulation and coding scheme (MCS) field for first transport blocks (TBs) of the N PDSCHs and (ii) a first redundancy version (RV) field including N bits each indicating an RV for each of the first TBs of the N PDSCHs. Based on that the first MCS field for the first TBs of the N PDSCHs is set to a specific MCS and that all of the N bits included in the first RV field for the first TBs of the N PDSCHs are set to only a specific RV, the UE may determine that all of the first TBs are disabled for an entirety of the N PDSCHs.

An index of the specific MCS may be 26, and an index of the specific RV may be 2.

Based on that the first MCS field for the first TBs of the N PDSCHs is set to the specific MCS and that only a part of the N bits included in the first RV field are set to the specific RV, the UE may determine that all of the first TBs are enabled for the entirety of the N PDSCHs.

A maximum number of TBs capable of being received over one PDSCH may be set 2. The DCI may further include (iii) a second MCS field for second TBs of the N PDSCHs and (iv) a second RV field including N bits each indicating an RV for each of the second TBs of the N PDSCHs.

Based on that the second MCS field for the second TBs of the N PDSCHs is set to the specific MCS and that all of the N bits included in the second RV field for the second TBs of the N PDSCHs are set to only the specific RV, the UE may determine that all of the second TBs are disabled for the entirety of the N PDSCHs.

Based on that the second MCS field for the second TBs of the N PDSCHs is set to the specific MCS and that all of the N bits included in the second RV field for the second TBs of the N PDSCHs are set to only the specific RV, the UE may determine that all of the second TBs are disabled for the entirety of the N PDSCHs.

Each of the N bits included in the first RV field may indicate either RV0 or RV2 for a first TB of a related PDSCH.

The UE may receive configuration information related to multi-PDSCH scheduling through higher layer signaling. The higher layer signaling may include a TDRA table including a plurality of combinations of {K0, SLIV, Mapping Type}. In each combination of {K0, SLIV, mapping type}, 'K0' may represent a slot offset from a slot of related DCI to a slot of a related PDSCH, 'SLIV' may represent a start symbol of the related PDSCH and a symbol duration of the related PDSCH, and 'Mapping Type' may be information for determining a location of a DMRS symbol of the related PDSCH. The DCI may indicate one row of the TDRA table.

The DCI may further include a first NDI field including N bits.

Each of the N bits of the first NDI field may be associated with each of the first TBs of the N PDSCHs.

In another aspect of the present disclosure, provided herein is a computer-readable recording medium having recorded thereon a program for executing the signal reception method described above.

In another aspect of the present disclosure, provided herein is a UE configured to perform the signal reception method described above.

In another aspect of the present disclosure, provided herein is a device configured to control the UE that performs the signal transmission method described above.

In another aspect of the present disclosure, provided herein is a method of transmitting a signal by a base station (BS) in a wireless communication system. The method may include: transmitting DCI for scheduling N PDSCHs through a single PDCCH; and transmitting the N PDSCHs based on the DCI. The DCI may include (i) a first MCS field for first TBs of the N PDSCHs and (ii) a first RV field including N bits each indicating an RV for each of the first TBs of the N PDSCHs. The BS may inform a UE that all of the first TBs are disabled for an entirety of the N PDSCHs by setting the first MCS field for the first TBs of the N PDSCHs to a specific MCS and setting all of the N bits included in the first RV field for the first TBs of the N PDSCHs to only a specific RV.

In a further aspect of the present disclosure, provided herein is a BS configured to perform the signal transmission method described above.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1:
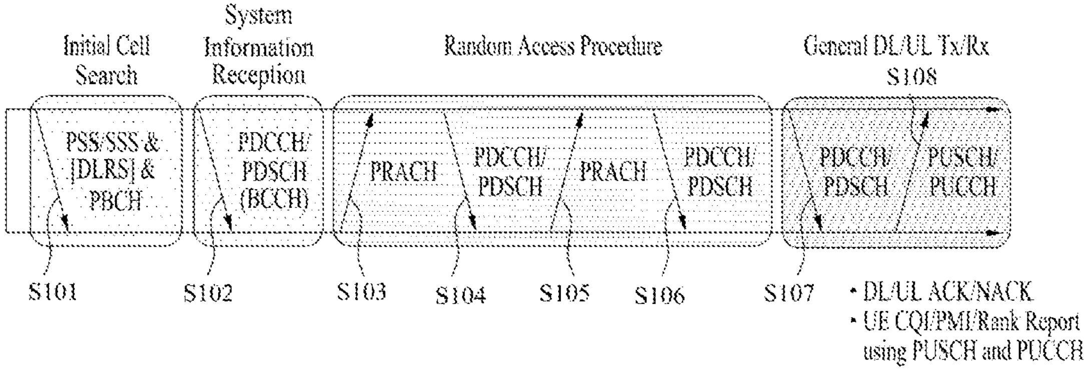
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration," and both may be used interchangeably. Further, a conditional expression (e.g., "if", "in a case", or "when") may be replaced by "based on that" or "in a state/status." In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least part of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
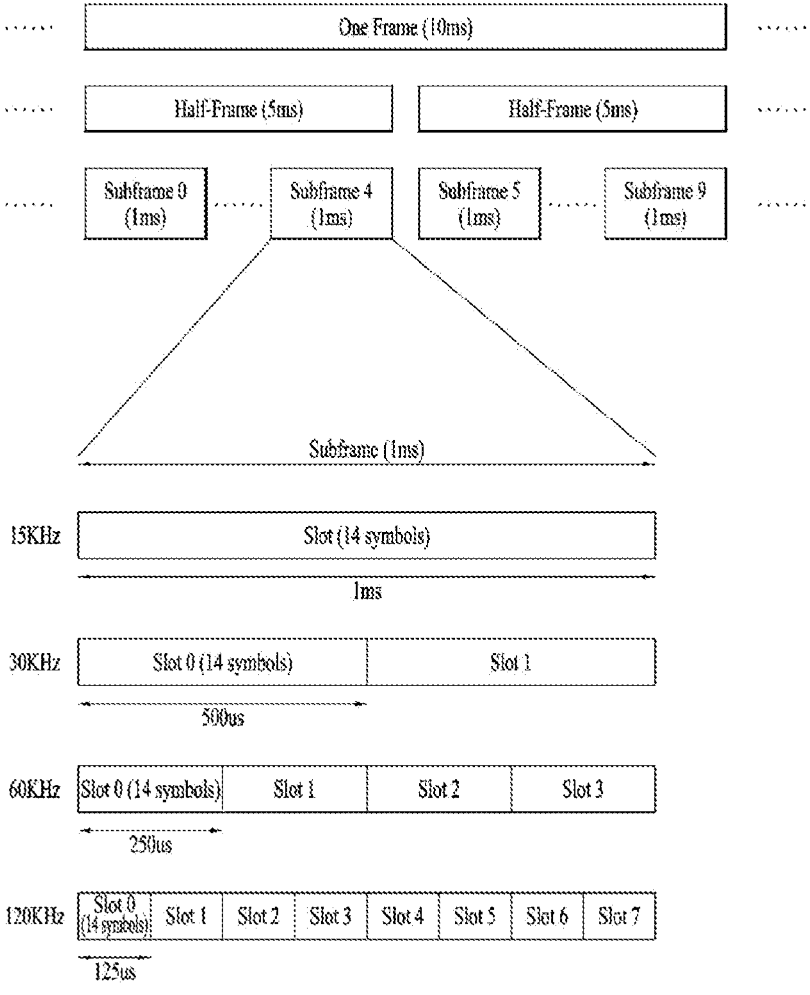
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2 ^ u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N_{symb}^{slot}$: Number of symbols in a slot
* $N_{slot}^{frame,u}$: Number of slots in a frame
* $N_{slot}^{subframe,u}$: Number of slots in a subframe Table 2 illustrates that the number of symbols per slot, the number of slots per frame, and the number of slots per subframe vary according to the SCS when the extended CP is used.

TABLE 2

| SCS (15 * 2 ^ u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot, or a transmission time interval (TTI)) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
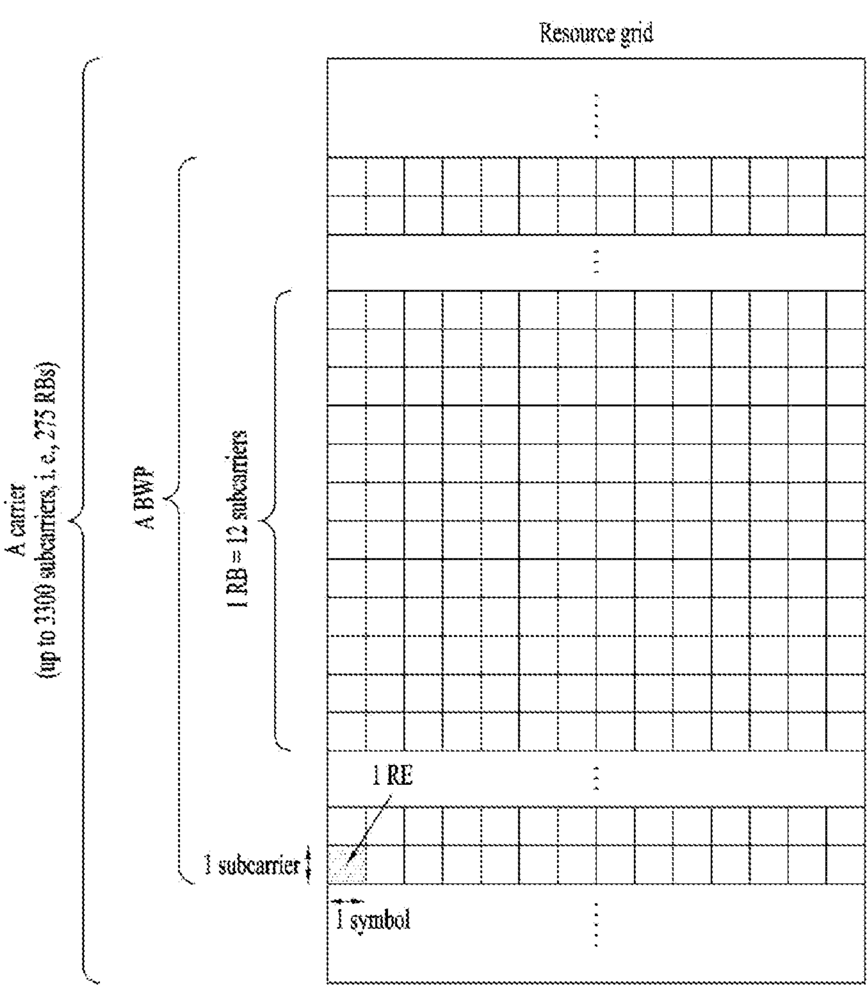
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
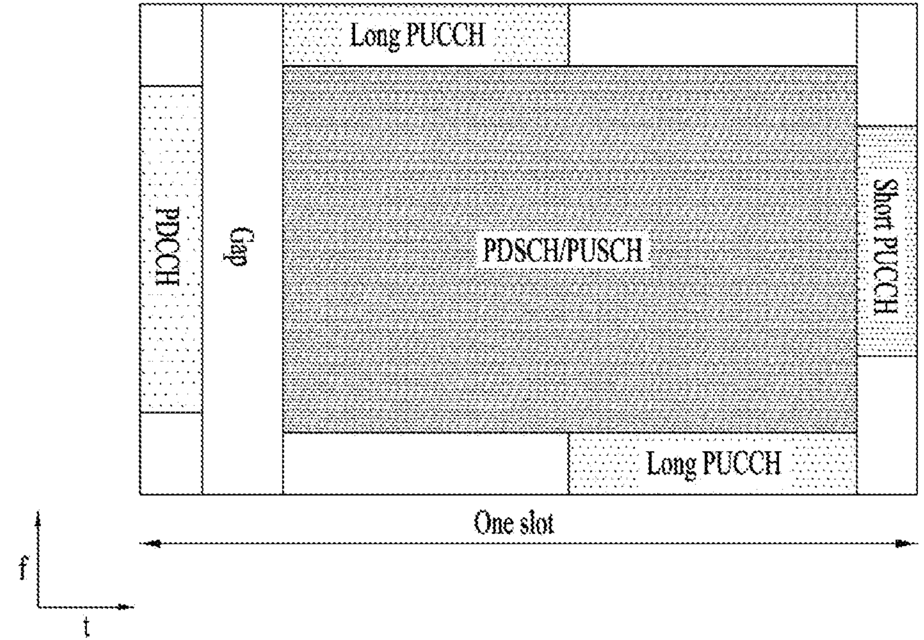
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicityAndOffset: A PDCCH monitoring periodicity (in slots) and a PDCCH monitoring offset (in slots).

monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL={1, 2, 4, 8, 16}.

An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A transport block (TB) is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

System information (SIB1) broadcast in a cell includes cell-specific PDSCH configuration information, PDSCH-ConfigCommon. PDSCH-ConfigCommon includes a list of parameters (or a look-up table) related to a time-domain resource allocation for a PDSCH, pdsch-TimeDomainAllocationList. pdsch-TimeDomainAllocationList may include up to 16 entries (or rows) each having {K0, PDSCH mapping type, PDSCH start symbol and length (SLIV)} which are jointly encoded. Aside from (additionally to) pdsch-TimeDomainAllocationList configured by PDSCH-ConfigCommon, pdsch-TimeDomainAllocationList may also be provided by a UE-specific PDSCH configuration, PDSCH-Config. UE-specifically configured pdsch-TimeDomainAllocationList may have the same structure as UE-commonly configured pdsch-TimeDomainAllocationList. For K0 and SLIV of pdsch-TimeDomainAllocationList, the following description including that of FIG. 5 may be referred to.

The PUCCH delivers uplink control information (UCI). The UCI includes the following information.

SR (Scheduling Request): Information used to request UL-SCH resources.

CSI (Channel State Information): Feedback information for a DL channel. Multiple input multiple output (MIMO)-related feedback information includes an RI and a PMI.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
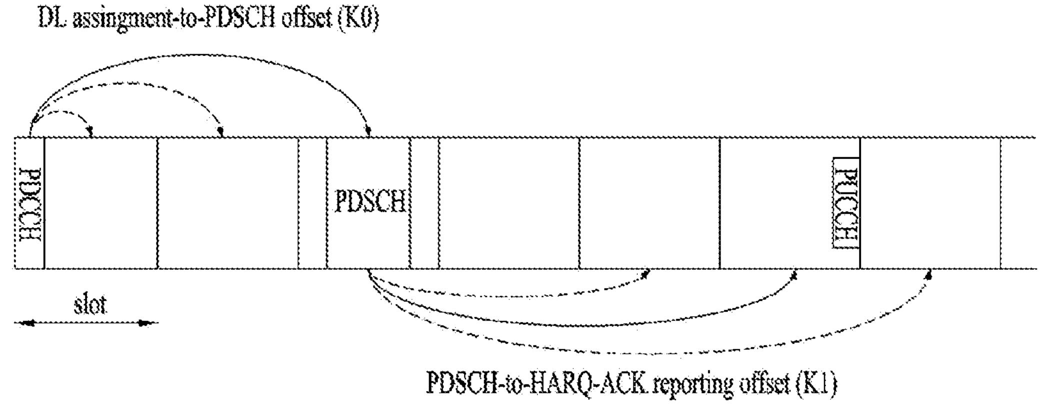
FIG. 5 illustrates an exemplary acknowledgment/negative acknowledgment (ACK/NACK) transmission process.

FIG. 5 illustrates an exemplary PDSCH reception and ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

- Frequency domain resource assignment: Indicates an RB set assigned to a PDSCH.
- Time domain resource assignment: Indicates K0 and the starting position (e.g., OFDM symbol index) and length (e.g., the number of OFDM symbols) of the PDSCH in a slot. As described above, a row index of pdsch-TimeDomainAllocationList provided UE-commonly or UE-specifically may be indicated by a TDRA field.
- PDSCH-to-HARQ_feedback timing indicator: Indicates K1.
- HARQ process number (4 bits): Indicates the HARQ process ID of data (e.g., a PDSCH or TB).
- PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCode WordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
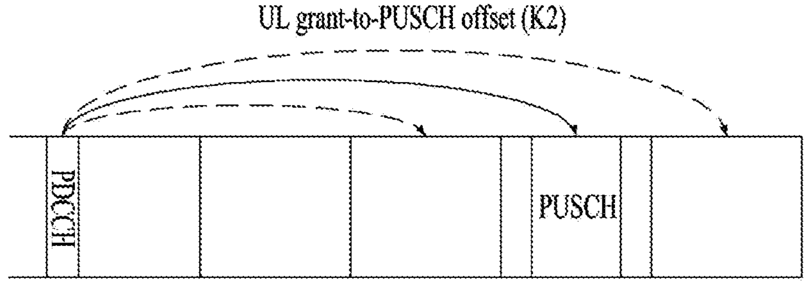
FIG. 6 illustrates an exemplary physical uplink shared channel (PUSCH) transmission process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

- Frequency domain resource assignment: Indicates an RB set assigned to the PUSCH.
- Time domain resource assignment: Indicates a slot offset K2 and the starting position (e.g., OFDM symbol index) and duration (e.g., the number of OFDM symbols) of the PUSCH in a slot. The starting symbol and length of the PUSCH may be indicated by a start and length indicator value (SLIV).

The UE may then transmit a PUSCH in slot #(n+K2) according to the scheduling information in slot #n. The PUSCH includes a UL-SCH TB.

Figure 7:
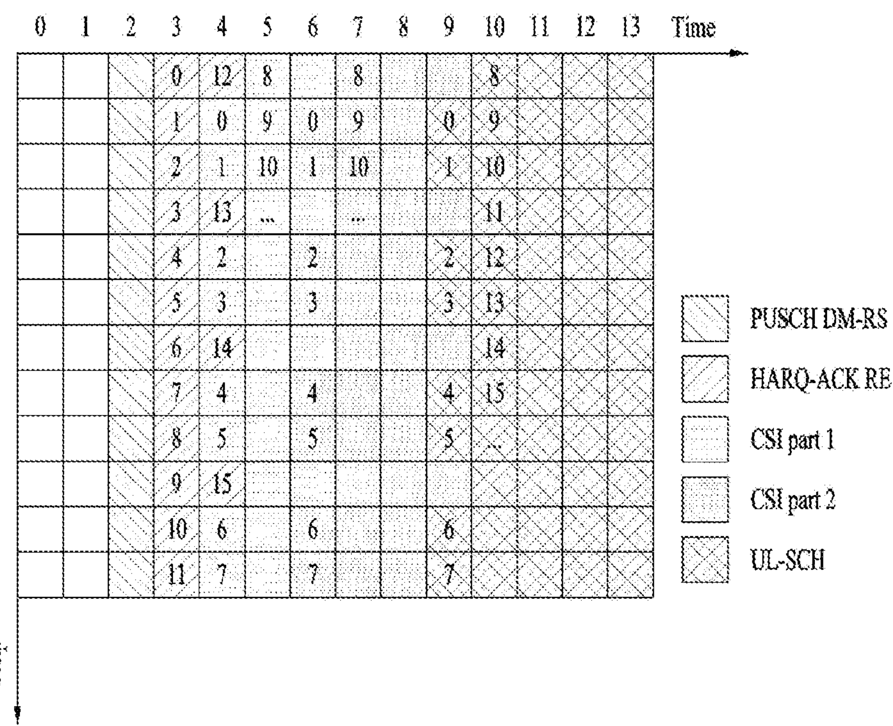
FIG. 7 illustrates an example of multiplexing control information in a PUSCH.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

In an NR Rel. 15/16 system, three HARQ-ACK codebook types are defined depending on how an HARQ-ACK bit (payload) is configured: Type 1, Type 2, and Type 3. In the Type-1 codebook, HARQ-ACK payload is configured according to a combination of a candidate HARQ-ACK timing (K1) set and a candidate PDSCH occasion (SLIV) set (configured for a corresponding cell on a cell basis) (e.g., a codebook of a semi-static fixed length based on RRC signaling). In a Type-2 codebook, a codebook size may be changed dynamically according to the number of actually scheduled PDSCHs or the number (e.g., DAI) of corresponding resource allocations. In a Type-3 codebook, HARQ-ACK payload is configured by mapping an HARQ-ACK bit to a corresponding HARQ process number (HPN) on an HPN basis according to the maximum number of HARQ processes (configured for a corresponding cell on a cell basis) (e.g., one shot A/N reporting)

Multi-PDSCH Scheduling/Transmission/Reception Based on Single DCI

The 3GPP (e.g., Rel-15 and Rel-16) has recently worked on standardization of a 5G system called new RAT (NR). The NR system seeks to support a plurality of logical networks in a single physical system. For this purpose, the NR system is designed to support services (e.g., eMBB, mMTC, and URLLC) having various requirements by performing/modifying an analog/hybrid beamforming operation or the like in consideration of various OFDM numerologies (e.g., OFDM symbol durations, subcarrier spacings (SCSs), and CP lengths), a wide operating frequency range (up to about 50 GHz), and characteristics of a high frequency band.

In Rel-17, a need for developing an NR (i.e., high frequency (HF) NR) system operating in a high frequency band (e.g., at or above 60 to 70 GHz) higher than in the legacy Rel-15/16-based NR system is considered. In consideration of a higher frequency and wider bandwidth than in the legacy NR, and radio channel characteristics such as a larger phase noise and/or larger Doppler shift caused by the high frequency band, introduction and application of a new OFDM numerology based on a larger SCS (e.g., 240 KHz, 480 KHz, or 960 KHz) than the SCSs of legacy NR (e.g., the numerology defined in 3GPP TS 38.211, such as 15 KHz, 30 KHz, 60 KHz, and 120 KHz) may be considered.

When a large SCS is used in the HF NR system, the OFDM symbol duration and the slot duration are shortened as much (e.g., when the SCS increases by N times in the frequency domain, the symbol duration and/or the slot duration decreases to 1/N in the time domain). Accordingly, a cell plan to reduce cell coverage as much may be considered. However, otherwise (e.g., when (target) cell coverage is maintained to correspond to a legacy NR level or when the SCS of a system increases from a legacy NR SCS to a large SCS for HF NR, but the (target) cell coverage is not reduced, in inverse proportion to an SCS increase), there may be a need for supplementing the coverage for physical channel/signal transmission (e.g., a scheme that extends/supplements coverage in processing a physical channel/signal, so that a DL physical channel/signal may reach a UE at an edge/boundary of the target cell coverage or a UL physical channel/signal transmitted from the UE located at the edge/boundary of the target cell coverage reaches a BS). In addition, because the use of a large SCS decreases a CP length as much, it is necessary to consider the effect of the delay spread and/or phase noise of a radio channel, and/or a beam switching time.

The term "beam" may be replaced with (beamformed) signal/channel/resource transmitted through a corresponding beam. For example, the index of a beam may be generally expressed as the index of a signal/channel/resource corresponding to the beam. Alternatively, the term "beam" may be replaced with signal/channel/resource that is associated with a beam and thus identifies the beam. When a different Tx beam is configured for each RO, the BS may identify a TX Beam used by the UE through an RO index or SSB index associated with the RO.

Further, when the OFDM symbol and slot durations are reduced due to the use of a large SCS as described above, a transmission/reception operation (e.g., PDCCH monitoring) that the UE is to be performed in one symbol/slot duration requires fast processing, and in consideration of a UE processing burden (related to a PDCCH monitoring period), the introduction of a multi-TTI scheduling scheme may be considered, which simultaneously schedules a plurality of multiplexed PDSCHs (e.g., at least part of the PDSCHs are TDMed) by one DCI. For example, frequency bands available for multi-PDSCH scheduling by one DL DCI may include 120 kHz, 480 kHz, and/or 960 kHz, but the frequency bands are not limited thereto.

The meanings of terms as used herein are summarized as follows. To help the understanding of the terms, FIG. 5/6 and its description may be referred to.

- K0 (DL assignment-to-PDSCH offset): A slot interval between a DCI transmission slot and a PDSCH transmission slot (scheduled by corresponding DCI).
- SLIV (Start and Length Indicator Value): Information about the starting symbol and symbol duration (or ending symbol) of a PDSCH (PDSCH occasion).
- Mapping type: Information indicating whether the position of a DMRS symbol of a PDSCH is determined based on a symbol index within a slot duration or within a PDSCH duration.
- TDRA (Time Domain Resource Assignment) table: Includes a plurality of {K0, SLIV, mapping type} combinations (configured by RRC) (at least one combination is mapped to each of a plurality of rows in the table). A specific one row is indicated by DCI.
- K1 (PDSCH-to-HARQ_feedback timing indicator): A slot interval between a PDSCH transmission slot and an HARQ-ACK transmission slot (for a corresponding PDSCH reception).

Figure 8:
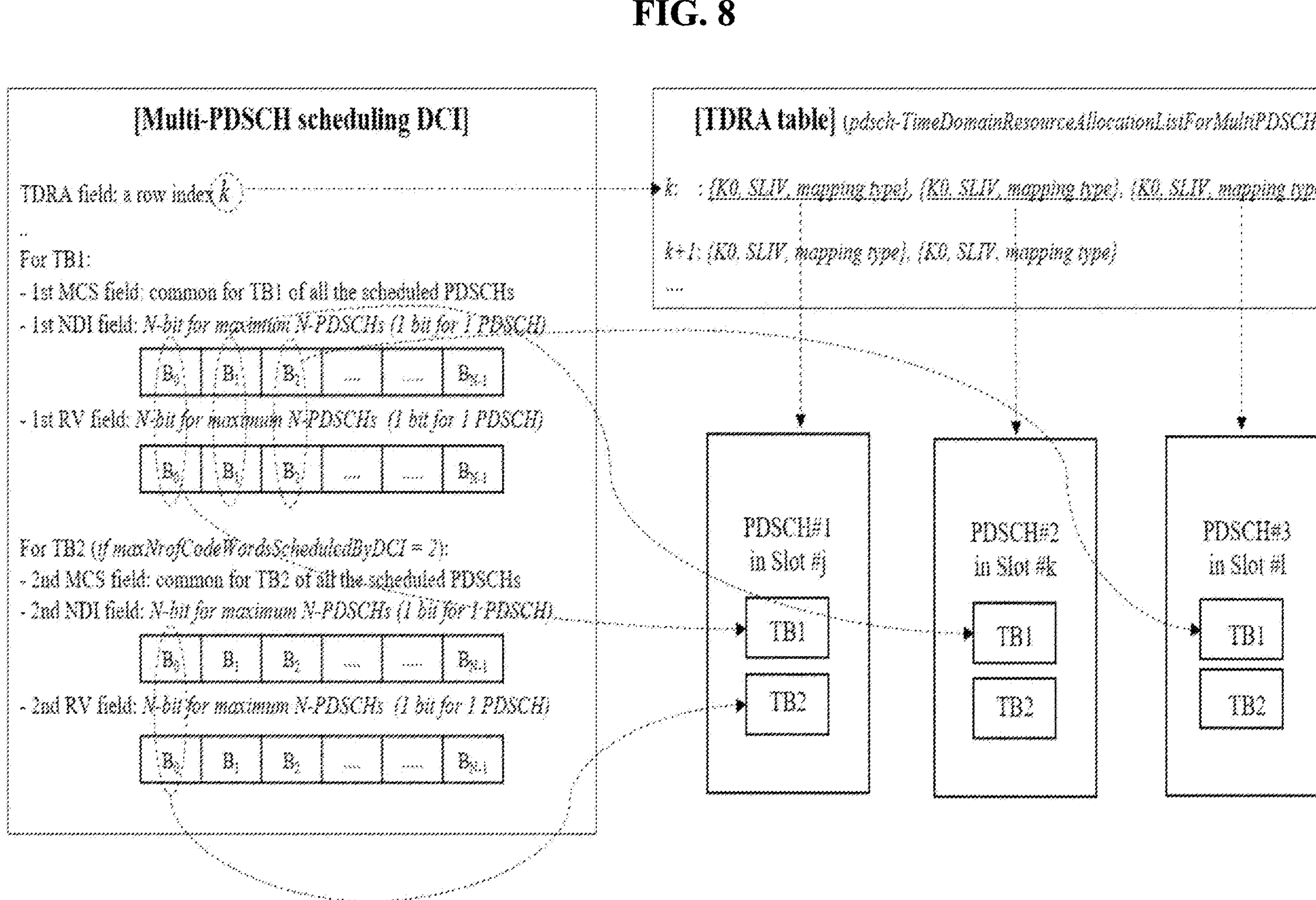
FIGS. 8 to 10 are diagrams for explaining downlink control information (DCI) scheduling multiple physical downlink shared channels (PDSCHs) (multi-PDSCH scheduling DCI) according to an embodiment of the present disclosure.

To schedule multiple PDSCHs in one DCI, each row of a TDRA table (e.g., higher layer parameter pdsch-TimeDomainResourceAllocationListForMultiPDSCH) for the UE may include one or more combinations of {K0, SLIV, Mapping Type}. For example, referring to FIG. 8, three combinations of {K0, SLIV, Mapping Type} combinations may be configured for row k of the TDRA table, and two combinations of {K0, SLIV, Mapping Type} may be configured for row k+1. If row index=k is indicated by the TDRA field in DCI, a total of three PDSCHs (PDSCH #1, PDSCH #2, and PDSCH #3) may be scheduled to the UE. In row k of the TDRA table, three combinations of {K0, SLIV, Mapping Type} may be associated with the three PDSCHs (PDSCH #1, PDSCH #2, and PDSCH #3), respectively.

Hereinafter, the configuration and signaling/application of multi-TTI (scheduling) DCI field information for simultaneous scheduling of multiple PDSCHs (each carrying one or more individual TBs) will be described.

(1) Configuration of New Data Indicator (NDI) Field/Information

1) Opt 1

A. When the maximum number of TBs capable of being transmitted on one PDSCH is set to 2 (for example, when the high layer parameter maxNrofCode WordsScheduledByDCI is configured such that transmission of (up to) two TBs over one PDSCH is allowed), 1) for PDSCHs scheduled by multi-TTI DCI, a specific 1-bit (e.g., TB-specific) NDI field may be configured/indicated for each TB (of each PDSCH), or 2) for the corresponding PDSCHs, a common 1-bit (e.g., TB-common) NDI field applied to two (transportable) TBs may be configured/indicated for each PDSCH. As a specific example, the following may be configured by RRC: 1) for PDSCHs scheduled by multi-TTI, whether a specific 1-bit (e.g., TB-specific) NDI field is configured/indicated for each TB (of each PDSCH); or 2) for the corresponding PDSCHs, whether a common 1-bit (e.g., TB-common) NDI field applied to two (transportable) TBs is configured/indicated for each PDSCH.

B. For example, referring to FIG. 8, for PDSCHs scheduled by one DCI, a 1-bit NDI is configured/indicated separately for each TB (of each PDSCH). When the maximum number of TBs capable of being transmitted on one PDSCH is set to 2 (for example, when the high layer parameter maxNrofCode WordsScheduledByDCI is configured such that transmission of (up to) two TBs over one PDSCH is allowed), the following fields may be provided for TB2: 2nd modulation and coding scheme (MCS) field, 2nd NDI field, and 2nd redundancy version (RV) field. A 1st NDI field may include a total of N NDI bits. The size 'N' of the 1st NDI field may be determined based on a row of the TDRA table that has the most combinations of {K0, SLIV, mapping type}. In other words, if the TDRA table is configured such that up to N PDSCHs are capable of being simultaneously scheduled by one DCI, the 1st NDI field may include N NDI bits to cover up to the N PDSCHs. Among the total N NDI bits of the 1st NDI field, an n-th NDI bit, which is denoted as $B_{n-1}$, may be the NDI for TB1 of PDSCH #n (e.g., $B_{n-1}$ indicates whether TB1 is a new transmission TB or a retransmission TB). Similarly, among the total N NDI bits of the 2nd NDI field, an n-th NDI bit, which is denoted as $B_{n-1}$, may be the NDI for TB2 of PDSCH #n (e.g., $B_{n-1}$ indicates whether TB2 is a new transmission TB or a retransmission TB).

2) Opt 2
   A. When the maximum number of TBs capable of being transmitted on one PDSCH is set to 2 (for example, when the high layer parameter maxNrofCodeWordsScheduledByDCI is configured such that transmission of (up to) two TBs over one PDSCH is allowed), if fewer than K PDSCHs are scheduled by multi-TTI DCI, a TB-specific NDI field may be configured/indicated for each TB for the corresponding PDSCHs. If more than K PDSCHs are scheduled by the multi-TTI DCI, the following may be configured by RRC: 1) whether a TB-specific NDI field is configured/indicated for each TB (of each PDSCH) for the corresponding PDSCHs; or 2) whether a TB-common NDI field is configured/indicated for each PDSCH of the corresponding PDSCHs.
   B. Regarding the value of K, for example, K=1 or K=N/2. Alternatively, the K value may be configured by RRC.

3) Note
   A. In all the options, the number of PDSCHs may mean the number of valid PDSCHs actually transmitted, excluding invalid PDSCHs which are not transmitted due to an overlap in time with a specific UL symbol (e.g., semi-statically configured UL symbol) or the total number of PDSCHs indicated by multi-TTI DCI, regardless of actual transmission.
   B. When the above options are applied, an increase in the number of NDI fields/bits configured in the multi-TTI DCI may be minimized, thereby reducing DCI overhead.

(2) Configuration of RV Field/Information

1) Opt 1
   A. When the maximum number of TBs capable of being transmitted on one PDSCH is set to 2, if fewer than K PDSCHs are scheduled by multi-TTI DCI, one 2-bit RV field may be configured/indicated for each PDSCH (that is, two TB transmitted on one PDSCH may be scheduled based on the same 2-bit RV value). If more than K PDSCHs are scheduled by the multi-TTI DCI, one 1-bit RV field may be configured/indicated for each PDSCH (That is, two TB transmitted on one PDSCH may be scheduled based on the same 1-bit RV value).
   B. Regarding the value of K, for example, K=1 or K=N/2. Alternatively, the K value may be configured by RRC.

2) Opt 2
   A. When the maximum number of TBs capable of being transmitted on one PDSCH is set to 2, the following may be configured by RRC: 1) for PDSCHs scheduled by multi-TTI DCI, whether a specific (e.g., TB-specific) RV field is configured/indicated for each TB (of each PDSCH) (i.e., two RV fields are configured/indicated for each PDSCH); or 2) for the corresponding PDSCHs, whether a common (e.g., TB-common) RV field is configured/indicated for each PDSCH (i.e., whether two TB transmitted on one PDSCH are scheduled based on the same RV value).

3) Opt 3
   A. When the maximum number of TBs capable of being transmitted on one PDSCH is set to 2, if fewer than K PDSCHs are scheduled by multi-TTI DCI, a TB-specific RV field may be configured/indicated for each TB. If more than K PDSCHs are scheduled by the multi-TTI DCI, the following may be configured by RRC: 1) for the corresponding PDSCHS, whether a TB-specific RV field is configured/indicated for each TB (of each PDSCH); or 2) for the corresponding PDSCHS, whether a TB-common RV field is configured/indicated for each PDSCH.
   B. Regarding the value of K, for example, K=1 or K=N/2. Alternatively, the K value may be configured by RRC.

4) Opt 4
   A. When the maximum number of TBs capable of being transmitted on one PDSCH is set to 2, if a maximum of N PDSCHs is capable of being scheduled by a single multi-TTI DCI, the total number of NDI bits and RV bits configured/indicated by the corresponding DCI may be configured to be always less than or equal to O_max. When M (<=N) PDSCHs are actually scheduled by multi-TTI DCI, 1) if M×2 (for 1-bit NDI per TB)+M×4 (for 2-bit RV per TB)<=O_max, a 2-bit RV may be configured/indicated for each TB (of each PDSCH) for the M PDSCHs. 2) If M×2+M×4>O_max, a 1-bit RV may be configured/indicated for each TB (of each PDSCH) for the M PDSCHs. Alternatively, a 2-bit TB-common RV may be configured/indicated for each PDSCH, or a 1-bit TB-common RV may be configured/indicated for each PDSCH.
   B. Regarding O_max above, O_max may be a multiple of N, for example, O_max=3N. Alternatively, the O_max value may be configured by RRC.

5) Note
   A. In all the options, the number of PDSCHs may mean the number of valid PDSCHs actually transmitted, excluding invalid PDSCHs which are not transmitted due to an overlap in time with a specific UL symbol (e.g., semi-statically configured UL symbol) or the total number of PDSCHs indicated by multi-TTI DCI, regardless of actual transmission.
   B. When the above options are applied, an increase in the number of RV fields/bits configured in the multi-TTI DCI may be minimized, thereby reducing DCI overhead.

(2-A) TB Disabling Operation

1) Problem Situation
   A. In the case of single-TTI scheduling (where only one PDSCH is scheduled by one DCI (e.g., single-TTI DCI), when the maximum number of TBs capable of being transmitted on one PDSCH is set to 2 (for example, when the high layer parameter maxNrofCodeWordsScheduledByDCI is configured such that transmission of (up to) two TBs over one PDSCH is allowed), an operation of disabling transmission/reception of a specific TB transmission/reception is defined if a combination of a specific MCS index (e.g., 26) and a specific RV index (i.e., RV ID) (e.g., 1) is indicated by DCI.

B. When multiple PDSCHs are scheduled by one multi-TTI DCI (to reduce DCI overhead), a structure in which a 1-bit RV field/information is configured/indicated by DCI for each TB may be considered. The corresponding 1-bit RV field may indicate one of two specific RV indices including RV index 0 (for example, RV index 0 and X, where X may be 2 or 3), except for RV index 1 (which is not used frequently). For example, referring to FIG. 8, a specific 1-bit RV may be configured/indicated for each TB (of each PDSCH) for PDSCHs scheduled by one DCI. When the maximum number of TBs capable of being transmitted on one PDSCH is set to 2 (for example, when the high layer parameter maxNrofCode WordsScheduledByDCI is configured such that transmission of (up to) two TBs over one PDSCH is allowed), the following fields may be provided for TB2: 2nd MCS field, 2nd NDI field, and 2nd RV field. A 1st RV field may include a total of N bits. The size 'N' of the 1st RV field may be determined based on a row of the TDRA table that has the most combinations of {K0, SLIV, mapping type}. In other words, if the TDRA table is configured such that up to N PDSCHs are capable of being simultaneously scheduled by one DCI, the 1st RV field may include N RV bits to cover up to the N PDSCHs. Among the total N RV bits of the 1st RV field, an n-th bit, which is denoted as $B_{n-1}$, may be the RV for TB1 of PDSCH #n (e.g., $B_{n-1}$ indicates whether the RV index of TB1 is RV0 or RV2). Similarly, among the total N RV bits of the 2nd RV field, an n-th bit, which is denoted as $B_{n-1}$, may be the RV for TB2 of PDSCH #n (e.g., $B_{n-1}$ indicates whether the RV index of TB2 is RV0 or RV2). C. Thus, when the maximum number of TBs capable of being transmitted on one PDSCH is set to 2 (for example, when transmission of 2 TBs is scheduled by one PDSCH, if a plurality of PDSCHs are scheduled simultaneously by multi-TTI DCI, it may be necessary to consider how to indicate/define the TB disabling operation.

2) Proposed Method

A. Opt 1 i. When a plurality of PDSCHs are scheduled by multi-TTI DCI, if a combination of a specific MCS index (e.g., 26) and an RV index (e.g., X=2 or 3) is indicated by the corresponding DCI, the TB disabling operation may be defined to be performed.

On the other hand, when only one PDSCH is scheduled by the multi-TTI DCI, a 2-bit RV field/information may be configured/indicated for each TB (as in current single-TTI DCI). In this case, the TB disabling operation may be performed if a combination of the specific MCS index (e.g., 26) and RV index 1 is indicated by the corresponding DCI.

Figure 9:
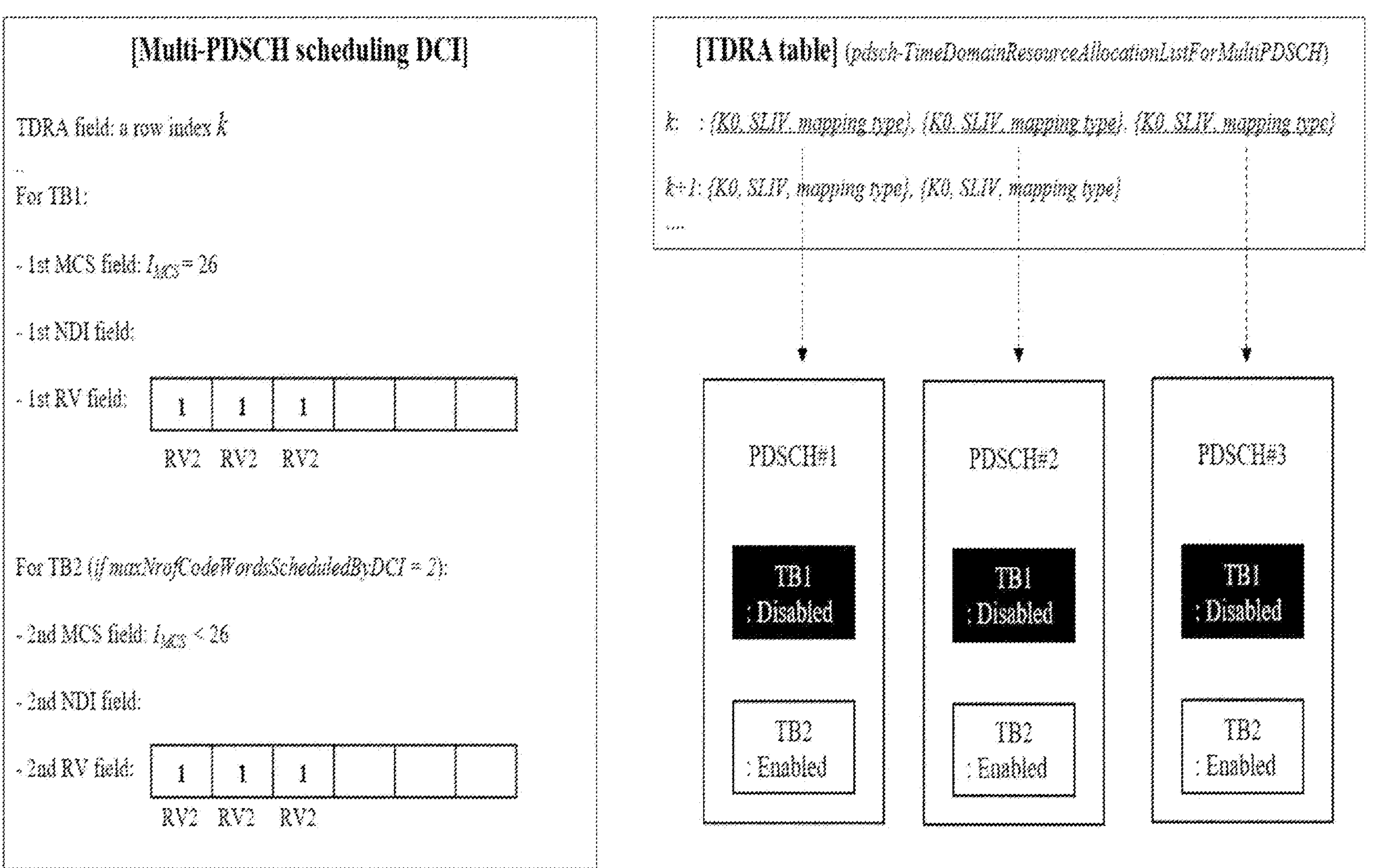
Figure 10:
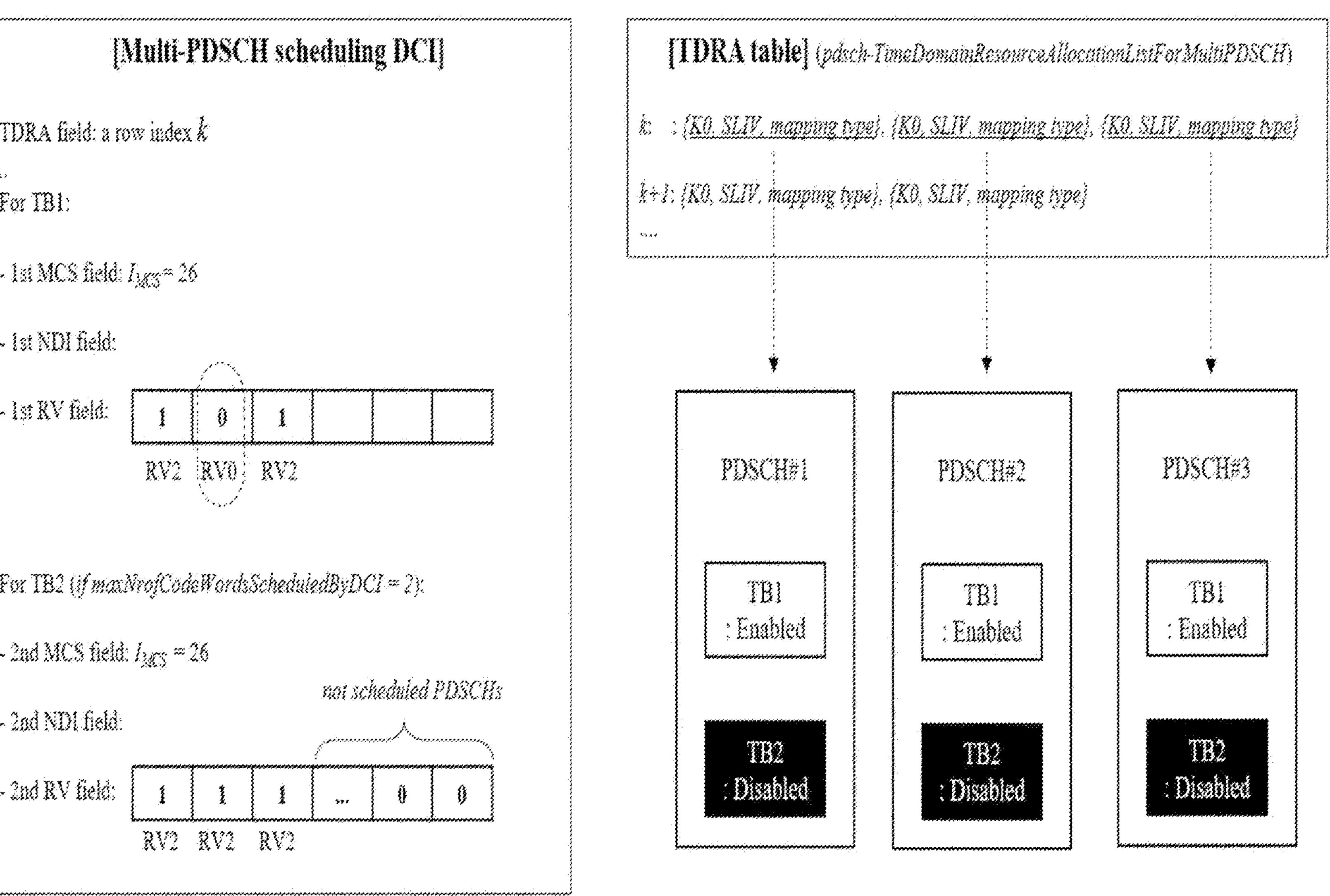

B. Opt 2 i. When a plurality of PDSCHs are scheduled by multi-TTI DCI, if a specific MCS index (e.g., 26) is indicated by the DCI, and if the RV index (related to a specific TB) for all scheduled PDSCHs is indicated as Z (where Z is X or 0), it may be defined to perform the TB disabling operation on all corresponding PDSCHs. For example, referring to FIG. 9, three PDSCHs are scheduled by DCI. When a specific MCS index (e.g., MCS 26) is indicated by the 1st MCS field for TB1, if RV index Z (e.g., RV2) is indicated for all three TBIs of three PDSCHs by the 1st RV field for TB1, TB1 may be disabled for all three PDSCHs. In FIG. 9, it is assumed that the maximum number of TBs capable of being transmitted on one PDSCH is set to 2 (for example, it is assumed that the high layer parameter maxNrofCode WordsScheduledByDCI is configured such that transmission of (up to) two TBs over one PDSCH is allowed). In FIG. 9, even when RV index Z (e.g., RV2) is indicated for all three TB2s of three PDSCHs by the 2nd RV field for TB2, if a specific MCS index (e.g., MCS 26) is not indicated by the 2nd MCS field for TB2, TB2 may be enabled for all three PDSCHs. Meanwhile, RV bits for which RV index Z is indicated for TB disabling may be RV bits associated with (actually) "scheduled" PDSCHs. For example, referring to FIG. 10, the following is assumed: the maximum number of TBs capable of being transmitted on one PDSCH is set to 2 (for example, the high layer parameter maxNrofCode WordsScheduledByDCI is configured such that transmission of (up to) two TBs over one PDSCH is allowed). In addition, it is also assumed that after the TDRA table is configured such that up to N PDSCHs are capable of being scheduled by DCI, the DCI received over a PDCCH actually schedules three PDSCHs. When the specific MCS index (e.g., MCS 26) is indicated by the 2nd MCS field for TB2, and when RV index Z (e.g., RV2) is indicated for all three TB2s of three PDSCHs by the 2nd RV field for TB2, TB2 may be disabled for all three PDSCHs. Referring to FIG. 10, when the three RV bits: B0, B1, and B2 of the 2nd RV field indicate RV index Z (e.g., RV2), TB2 may be disabled for all scheduled PDSCHs based on that the specific MCS index (e.g., MCS 26) is indicated by the 2nd MCS field, regardless of the remaining N−3 RV bits (e.g., RV bits for N−3 PDSCHs that are not actually scheduled).

Even when the MCS index (e.g., 26) is indicated by the multi-TTI DCI, if the RV index (related to the specific TB) is indicated as a value other than Z for at least one of the scheduled PDSCHs, each of a plurality of PDSCHs/TBs may be transmitted/received by directly applying the MCS index and RV index indicated by the corresponding DCI (without performing the TB disabling operation above). For example, referring to FIG. 10, when a specific MCS index (e.g., MCS 26) is indicated by the 1st MCS field for TB1 of three PDSCHs scheduled by one DCI, when RV index Z (e.g., RV2) is indicated for only some of the three RV bits of the three PDSCHs by the 1st RV field for TB1, and when RV index Z (e.g., RV2) is not indicated for the remaining RV bits, TB1 may be enabled for all three PDSCHs. Specifically, in FIG. 10, TB1 on PDSCH #1 may be transmitted based on MCS26 and RV2, TB1 on PDSCH #2 may be transmitted based on MCS26 and RV0, and TB1 on PDSCH #3 may be transmitted based on MCS26 and RV2.

The advantage of uniformly enabling/disabling TB1 (or TB2) for all scheduled PDSCHs is that the UE implementation/operation complexity is simplified. Even if TB1 (or TB2) is uniformly enabled/disabled for all scheduled PDSCHs, system inefficiency/performance degradation may not be significant. The reason is that for the FR2-2 band (where multi-PDSCH scheduling is performed), since a large SCS such as 480K/960K is used, the time duration spanned by multiple PDSCHs simultaneously scheduled by a single DCI is short, and as a result, there is a high probability that the reception success/failure results for a specific TB index are expected to be the same across the multiple PDSCH (at the time of previous transmission). In other words, since the results of receiving the specific TB index for all multiple PDSCHs will be probabilistically the same, the UE implementation/operation complexity may be reduced without significant performance degradation even if TB1 (or TB2) is uniformly enabled/disabled for all scheduled PDSCHs.

C. Opt 3 i. When multiple PDSCHs are scheduled by multi-TTI DCI and a specific MCS index (e.g., 26) is indicated by the DCI, one of two specific RV indices including RV index 1 (for example, RV index 1 and RV index Y, where Y may be 0, 2, or 3) may be indicated by a 1-bit RV field for each TB.

On the other hand, when the multiple PDSCHs are scheduled by the multi-TTI DCI and an MCS index other than the specific MCS index (e.g., 26) is indicated, one of RV index 0 and RV index X may be indicated by the 1-bit RV field for each TB.

D. Opt 4 i. If the number of PDSCHs scheduled by multi-TTI DCI is less than the maximum number of PDSCHs configured (or scheduled) by the corresponding DCI, whether to perform/apply the TB disabling operation may be indicated through specific bit(s) in the corresponding DCI (e.g., remaining bit(s) that are not used in field configuration such as MCS/NDI/RV, etc.).

On the other hand, if the number of PDSCHs scheduled by multi-TTI DCI is equal to the maximum number of PDSCHs configured (or scheduled) by the corresponding DCI, the TB disabling operation may not be allowed.

(3) Configuration of MCS Field/Information

1) Opt 1

A. When the maximum number of TBs capable of being transmitted on one PDSCH is set to 2, if fewer than K PDSCHs are scheduled by multi-TTI DCI, up to two TBs may be transmitted for each PDSCH (in this case, two MCS fields are configured/indicated for the PDSCHs scheduled by the DCI, that is, the MCS field is configured/indicated for two TB (indices) capable of being transmitted on the corresponding PDSCHs). If more than K PDSCHs are scheduled by the multi-TTI DCI, only one TB may be transmitted for each PDSCH (in this case, only one MCS field is configured/indicated for the PDSCHs scheduled by the DCI, that is, the MCS field is configured/indicated for one TB (index) capable of being transmitted on the corresponding PDSCHs)

B. Regarding the value of K, for example, K=1 or K=N/2. Alternatively, the K value may be configured by RRC.

2) Opt 2

A. When the maximum number of TBs capable of being transmitted on one PDSCH is set to 2, if fewer than K PDSCHs are scheduled by multi-TTI DCI, two MCS fields may be configured/indicated for the corresponding PDSCHs (that is, a specific (e.g., TB-specific) MCS field applied to each of the two TB (indices) capable of being transmitted on the corresponding PDSCHs is configured/indicated). On the other hand, if more than K PDSCHs are scheduled by the multi-TTI DCI, only one MCS field may be configured/indicated for the corresponding PDSCHs (that is, only one common (e.g., TB-common) MCS field applied to the two TB (indexes) capable of being transmitted on each of the corresponding PDSCHs is configured/indicated).

B. Regarding the value of K, for example, K=1 or K=N/2. Alternatively, the K value may be configured by RRC. For example, referring to FIG. 8, FIG. 9, or FIG. 10, when the maximum number of TBs capable of being transmitted on one PDSCH is set to 2 by the higher layer parameter maxNrofCode WordsScheduledByDCI and scheduling of up to N PDSCHs in one DCI is configured by the higher layer parameter pdsch-Time-DomainResourceAllocationListForMultiPDSCH, if M PDSCHs are scheduled by DCI (where M is an integer greater than or equal to 1 and less than or equal to N), the 1st MCS field may be commonly applied to TBIs of the M scheduled PDSCHs, and the 2nd MCS field may be commonly applied to TB2s of the M scheduled PDSCHs.

3) Opt 3

A. When the maximum number of TBs capable of being transmitted on one PDSCH is set to 2, the following may be configured by RRC: 1) for PDSCHs scheduled by multi-TTI DCI, whether Two TB-specific MCS fields are configured/indicated; or 2) for the corresponding PDSCHs, whether only one TB-common MCS field is be configured/indicated.

4) Opt 4

A. When the maximum number of TBs capable of being transmitted on one PDSCH is set to 2, if fewer than K PDSCHs are scheduled by multi-TTI DCI, the TB-specific MCS fields are configured/indicated for the corresponding PDSCH. If more than K PDSCHs are scheduled by the multi-TTI DCI, the following may be configured by RRC: 1) for the corresponding PDSCHs, two TB-specific MCS fields are configured/indicated; or 2) for the corresponding PDSCHs, whether only one TB-common MCS field is configured/indicated.

B. Regarding the value of K, for example, K=1 or K=N/2. Alternatively, the K value may be configured by RRC.

5) Opt 5

A. When the maximum number of TBs capable of being transmitted on one PDSCH is set to 2, for the first TB index of PDSCHs scheduled by multi-TTI DCI, an M-bit (e.g., full) MCS field (with the same size as the current single-TTI DCI) may be configured/indicated. For the second TB index, an L-bit (e.g., delta) MCS field (with a size smaller than M bits) may be configured/indicated. In this case, an offset relative to the MCS index (e.g., 1st MCS index) indicated by the M-bit MCS field (applied to the first TB index) may be indicated by the corresponding L-bit MCS field. The MCS index determined by adding the corresponding offset to the 1st MCS index may be applied to the second TB index.

6) Opt 6

A. When the maximum number of TBs capable of being transmitted on one PDSCH is set to 2, if fewer than K PDSCHs are scheduled by multi-TTI DCI, a full MCS field may be configured/indicated for each of the first TB index and second TB index of the PDSCHs. If more than K PDSCHs are scheduled by the multi-TTI DCI, the full MCS field may be configured/indicated for the first TB index of the corresponding PDSCHs, and a delta MCS field may be configured/indicated for the second TB index.

B. Regarding the value of K, for example, K=1 or K=N/2. Alternatively, the K value may be configured by RRC.

7) Opt 7

A. When the maximum number of TBs capable of being transmitted on one PDSCH is set to 2, the following may be configured by RRC: 1) whether a full MCS field is configured/indicated for the second TB index of PDSCHs scheduled by multi-TTI DCI; or 2) whether a delta MCS field is configured/indicated for the second TB index of the corresponding PDSCHs.

8) Opt 8

A. When the maximum number of TBs capable of being transmitted on one PDSCH is set to 2, if fewer than K PDSCHs are scheduled by multi-TTI DCI, a full MCS field may be configured/indicated for each of the first TB index and second TB index of the PDSCHs. On the other hand, if more than K PDSCHs are scheduled by the multi-TTI DCI, the following may be configured by RRC: 1) whether the full MCS field is configured/indicated for the second TB index of the corresponding PDSCHs; or 2) whether a delta MCS field is configured/indicated for the second TB index of the corresponding PDSCHs.

B. Regarding the value of K, for example, K=1 or K=N/2. Alternatively, the K value may be configured by RRC.

9) Note

A. In all the options, the number of PDSCHs may mean the number of valid PDSCHs actually transmitted, excluding invalid PDSCHs which are not transmitted due to an overlap in time with a specific UL symbol (e.g., semi-statically configured UL symbol) or the total number of PDSCHs indicated by multi-TTI DCI, regardless of actual transmission.

B. When the above options are applied, an increase in the number of MCS fields/bits configured in the multi-TTI DCI may be minimized, thereby reducing DCI overhead.

Figure 11:
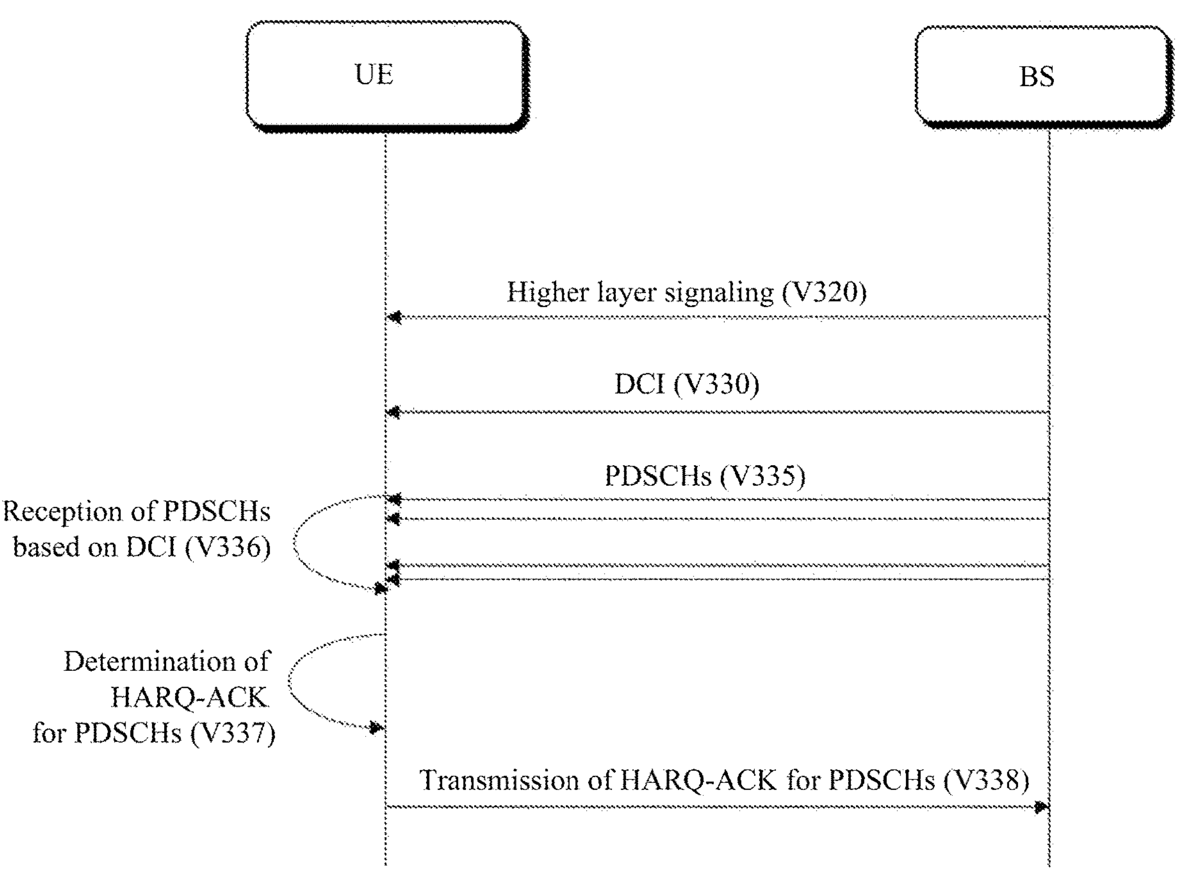
FIGS. 11 to 13 are flowcharts illustrating signal transmission and reception methods according to an embodiment of the present disclosure.

The distinction between various DCI field configuration methods/options described above is for convenience of explanation. Two or more configuration methods/options may be combined, or each method/option may be implemented independently FIG. 11 is a diagram for explaining multi-TTI/PDSCH scheduling according to an embodiment of the present disclosure. FIG. 11 is exemplary, and the present disclosure is not limited thereto.

Referring to FIG. 11, the UE may receive information from the BS through higher layer signaling (V320). For example, configuration information related to multi-TTI PDSCH scheduling, configuration information related to multi-TTI PDSCH HARQ-ACK feedback, and so on may be received through the higher layer signaling. For example, higher layer parameters (or tables) related to values indicated by the state of at least one field among fields (1) to (8) in DCI may be configured.

The UE may receive the DCI (a single PDCCH signal) (V330). The UE may perform blind detection for the DCI scheduling multi-TTI PDSCHs based on the information through the higher layer signaling.

The BS may transmit multiple scheduled PDSCHs by one DCI transmission (V335). The UE may receive the multi-TTI PDSCHs based on the DCI. For example, the multi-TTI PDSCHs may be received based on the state of at least one field among fields (1) to (8) in the DCI.

The UE may generate/determine a HARQ-ACK for the received PDSCHs (all or at least part of the PDSCHs) (V337). The HARQ-ACK may be generated based on a specific codebook. The UE may refer to the information through the higher layer signaling and/or DCI for the HARQ-ACK generation/determination.

The UE may transmit the HARQ-ACK for the PDSCHs (V338). HARQ-ACK transmission resources (time resources, timing, etc.) may be determined based on the DCI.

Figure 12:
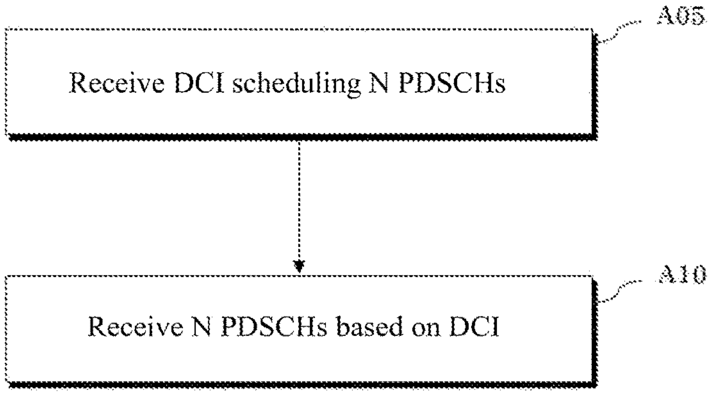

FIG. 12 illustrates a method by which a UE receives a signal in a wireless communication system according to an embodiment of the present disclosure. FIG. 12 is exemplary, and the present disclosure is not limited thereto.

Referring to FIG. 12, the UE may receive DCI for scheduling N PDSCHs through a single PDCCH (A05).

The UE may receive the N PDSCHs based on the DCI (A10).

The DCI may include (i) a first MCS field for first TBs of the N PDSCHs and (ii) a first RV field including N bits each indicating an RV for each of the first TBs of the N PDSCHs. Based on that the first MCS field for the first TBs of the N PDSCHs is set to a specific MCS and that the N bits included in the first RV field for the first TBs of the N PDSCHs are all set to a specific RV, the UE may determine that all of the first TBs are disabled for all of the N PDSCHs.

An index of the specific MCS may be 26, and an index of the specific RV may be 2.

Based on that the first MCS field for the first TBs of the N PDSCHs is set to the specific MCS and that only a part of the N bits included in the first RV field are set to the specific RV, the UE may determine that all of the first TBs are enabled for the entirety of the N PDSCHs.

A maximum number of TBs capable of being received over one PDSCH may be set 2. The DCI may further include (iii) a second MCS field for second TBs of the N PDSCHs and (iv) a second RV field including N bits each indicating an RV for each of the second TBs of the N PDSCHs.

Based on that the second MCS field for the second TBs of the N PDSCHs is set to the specific MCS and that all of the N bits included in the second RV field for the second TBs of the N PDSCHs are set to only the specific RV, the UE may determine that all of the second TBs are disabled for the entirety of the N PDSCHs.

Based on that the first MCS field is set to the specific MCS and that the N bits among all bits of the first RV field are all set to only the specific RV, the UE may determine that all of the first TBs are disabled for the entirety of the N PDSCHs.

Each of the N bits included in the first RV field may indicate either RV0 or RV2 for a first TB of a related PDSCH.

The UE may receive configuration information related to multi-PDSCH scheduling through higher layer signaling (e.g., V320 in FIG. 11). The higher layer signaling may include a TDRA table including a plurality of combinations of {K0, SLIV, Mapping Type}. In each combination of {K0, SLIV, mapping type}, 'K0' may represent a slot offset from a slot of related DCI to a slot of a related PDSCH, 'SLIV' may represent a start symbol of the related PDSCH and a symbol duration of the related PDSCH, and 'Mapping Type' may be information for determining a location of a DMRS symbol of the related PDSCH. The DCI may indicate one row of the TDRA table.

The DCI may further include a first NDI field including N bits.

Figures 13, 14:
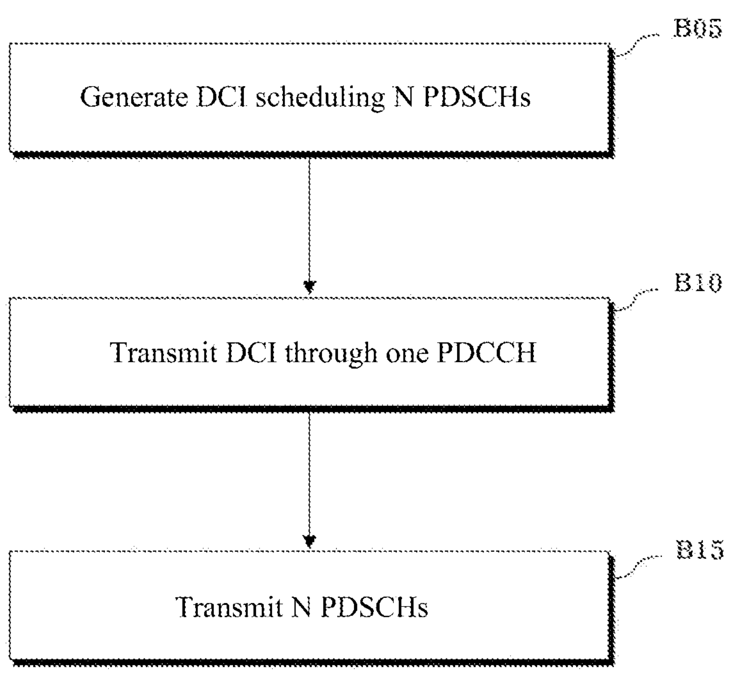
FIGS. 14 to 17 illustrate an example of a communication system 1 and wireless devices applied to the present disclosure.

FIG. 13 illustrates a method by which a BS signals a signal in a wireless communication system according to an embodiment of the present disclosure. FIG. 13 is exemplary, and the present disclosure is not limited thereto.

Referring to FIG. 13, the BS may generate DCI for scheduling N PDSCHs (B05).

The BS may transmit DCI through a single PDCCH (B10).

The BS may transmit the N PDSCHs scheduled by the DCI (B15).

The DCI may include (i) a first MCS field for first TBs of the N PDSCHs and (ii) a first RV field including N bits each indicating an RV for each of the first TBs of the N PDSCHs. The BS may inform a UE that all of the first TBs are disabled for an entirety of the N PDSCHs by setting the first MCS field for the first TBs of the N PDSCHs to a specific MCS and setting all of the N bits included in the first RV field for the first TBs of the N PDSCHs to only a specific RV.

An index of the specific MCS may be 26, and an index of the specific RV may be 2.

When the first MCS field for the first TBs of the N PDSCHs is set to the specific MCS and when only a part of the N bits included in the first RV field are set to the specific RV, all of the first TBs may be enabled for the entirety of the N PDSCHs.

A maximum number of TBs capable of being received over one PDSCH may be set 2. The DCI may further include (iii) a second MCS field for second TBs of the N PDSCHs and (iv) a second RV field including N bits each indicating an RV for each of the second TBs of the N PDSCHs.

The BS may inform the UE that all of the second TBs are disabled for the entirety of the N PDSCHs by setting the second MCS field for the second TBs of the N PDSCHs to the specific MCS and setting all of the N bits included in the second RV field for the second TBs of the N PDSCHs to only the specific RV.

The BS may inform the UE that all of the first TBs are disabled for the entirety of the N PDSCHs by setting the first MCS field to the specific MCS and setting all of the N bits among all bits of the first RV field to only the specific RV.

Each of the N bits included in the first RV field may indicate either RV0 or RV2 for a first TB of a related PDSCH.

The BS may transmit configuration information related to multi-PDSCH scheduling through higher layer signaling (e.g., V320 in FIG. 11). The higher layer signaling may include a TDRA table including a plurality of combinations of {K0, SLIV, Mapping Type}. In each combination of {K0, SLIV, mapping type}, 'K0' may represent a slot offset from a slot of related DCI to a slot of a related PDSCH, 'SLIV' may represent a start symbol of the related PDSCH and a symbol duration of the related PDSCH, and 'Mapping Type' may be information for determining a location of a DMRS symbol of the related PDSCH. The DCI may indicate one row of the TDRA table.

The DCI may further include a first NDI field including N bits.

For convenience of description, the present disclosure has been described with a focus on multi-PDSCH scheduling based on DL grant DCI. However, it will be understood by those skilled in the art that the multi-TTI scheduling method according to the present disclosure is not limited to DL and is applicable to multi-PUSCH scheduling based on UL grant DCI. For instance, multi-TTI scheduling DCI may refer to at least one of multi-PDSCH scheduling DCI, which schedules multiple PDSCHs multiplexed in the time domain, and multi-PUSCH scheduling DCI, which schedules multiple PUSCHs multiplexed in the time domain.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
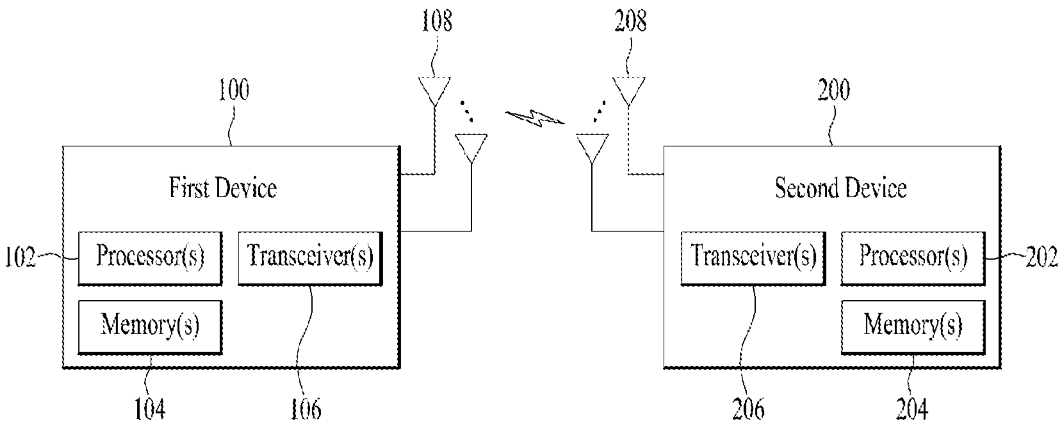

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
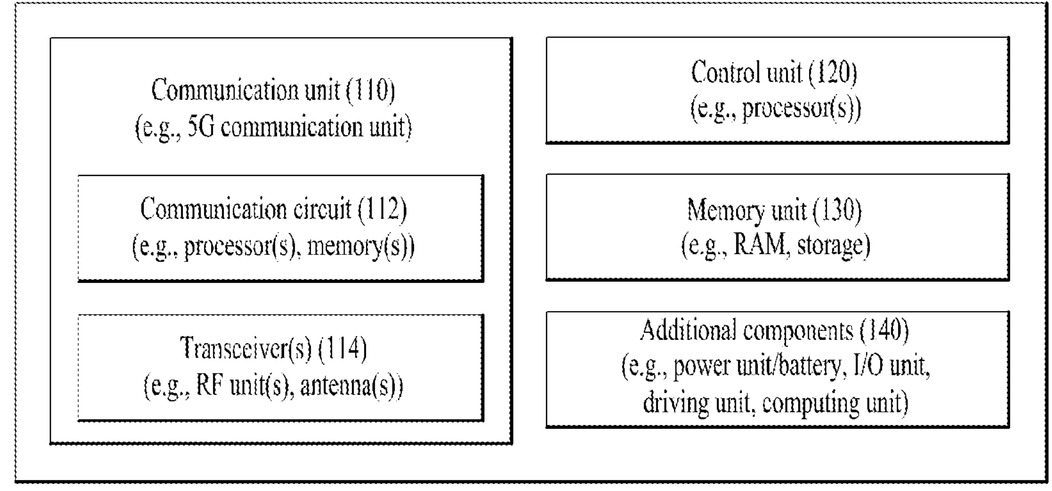

FIG. 16 illustrates another example of a wireless device applied to the present disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 14), the vehicles (100*b*-1 and 100*b*-2 of FIG. 14), the XR device (100*c* of FIG. 14), the hand-held device (100*d* of FIG. 14), the home appliance (100*e* of FIG. 14), the IoT device (100*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
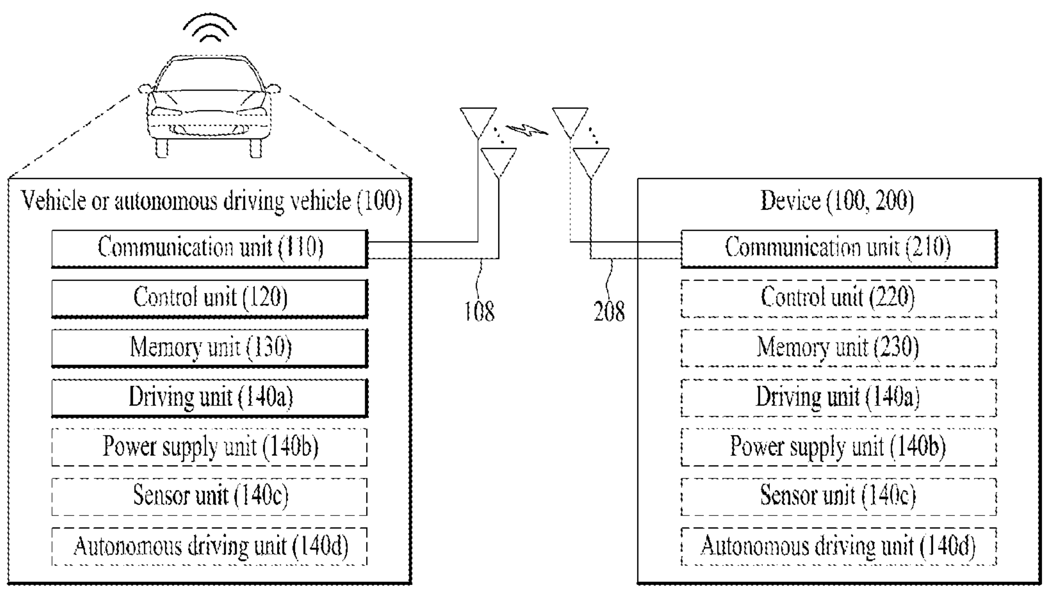

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 18:
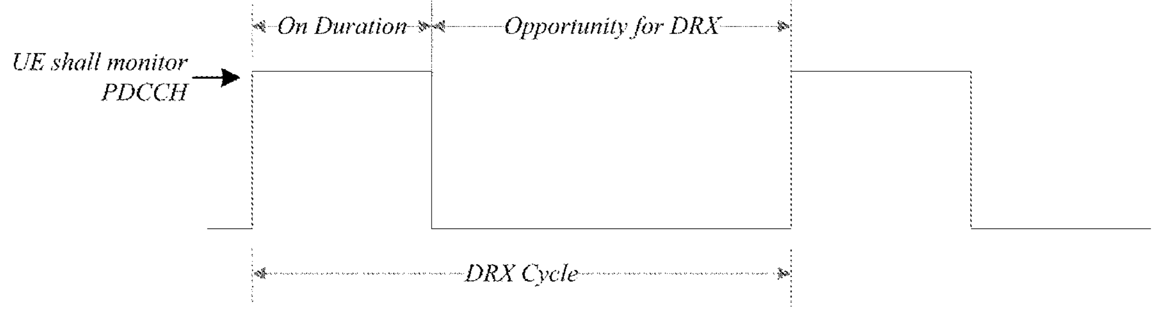
FIG. 18 illustrates an exemplary discontinuous reception (DRX) operation applicable to the present disclosure.

FIG. 18 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 18, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 6 describes a DRX operation of a UE (in the RRC_CONNECTED state). Referring to Table 6, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 6

| | Type of signals | UE procedure |
|---|---|---|
| 1st step | RRC signalling(MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method of receiving a signal by a user equipment (UE) in a wireless communication system, the method comprising:

receiving, through a single physical downlink control channel (PDCCH), downlink control information (DCI) for scheduling N physical downlink shared channels (PDSCHs); and receiving the N PDSCHs based on the DCI, wherein the DCI includes (i) a first modulation and coding scheme (MCS) field for first transport blocks (TBs) of the N PDSCHs and (ii) a first redundancy version (RV) field including N bits each indicating an RV for each of the first TBs of the N PDSCHs, and wherein, based on that the first MCS field for the first TBs of the N PDSCHs is set to a specific MCS and that all of the N bits included in the first RV field for the first TBs of the N PDSCHs are set to only a specific RV, the UE determines that all of the first TBs are disabled for an entirety of the N PDSCHs.

2. The method of claim 1, wherein an index of the specific MCS is 26, and wherein an index of the specific RV is 2.

3. The method of claim 1, wherein, based on that the first MCS field for the first TBs of the N PDSCHs is set to the specific MCS and that only a part of the N bits included in the first RV field are set to only the specific RV, the UE determines that all of the first TBs are enabled for the entirety of the N PDSCHs.

4. The method of claim 1, wherein a maximum number of TBs capable of being received over one PDSCH is set 2, and wherein the DCI further includes (iii) a second MCS field for second TBs of the N PDSCHs and (iv) a second RV field including N bits each indicating an RV for each of the second TBs of the N PDSCHs.

5. The method of claim 4, wherein, based on that the second MCS field for the second TBs of the N PDSCHs is set to the specific MCS and that all of the N bits included in the second RV field for the second TBs of the N PDSCHs are set to only the specific RV, the UE determines that all of the second TBs are disabled for the entirety of the N PDSCHs.

6. The method of claim 1, wherein, based on that the first MCS field is set to the specific MCS and that the N bits among all bits of the first RV field are all set to only the specific RV, the UE determines that all of the first TBs are disabled for the entirety of the N PDSCHs.

7. The method of claim 1, wherein each of the N bits included in the first RV field indicates either RV0 or RV2 for a first TB of a related PDSCH.

8. The method of claim 1, further comprising:

receiving configuration information related to multi-PDSCH scheduling through higher layer signaling.

9. The method of claim 8, wherein the higher layer signaling includes a time domain resource allocation (TDRA) table including a plurality of combinations of {K0, SLIV, Mapping Type}, wherein in each combination of {K0, SLIV, mapping type}:

'K0' represents a slot offset from a slot of related DCI to a slot of a related PDSCH;

'SLIV' represents a start symbol of the related PDSCH and a symbol duration of the related PDSCH; and 'Mapping Type' is information for determining a location of a demodulation reference signal (DMRS) symbol of the related PDSCH, and wherein the DCI indicates one row of the TDRA table.

10. The method of claim 1, wherein the DCI further includes a first new data indicator (NDI) field including N bits, and wherein each of the N bits of the first NDI field is associated with each of the first TBs of the N PDSCHs.

11. A non-transitory computer-readable recording medium having recorded thereon a program for executing the method of claim 1.

12. A device for wireless communication, the device comprising:

a memory configured to store instructions; and a processor configured to perform operations by executing the instructions, wherein the operations performed by the processor comprise:

receiving, through a single physical downlink control channel (PDCCH), downlink control information (DCI) for scheduling N physical downlink shared channels (PDSCHs); and receiving the N PDSCHs based on the DCI, wherein the DCI includes (i) a first modulation and coding scheme (MCS) field for first transport blocks (TBs) of the N PDSCHs and (ii) a first redundancy version (RV) field including N bits each indicating an RV for each of the first TBs of the N PDSCHs, and wherein, based on that the first MCS field for the first TBs of the N PDSCHs is set to a specific MCS and that all of the N bits included in the first RV field for the first TBs of the N PDSCHs are set to only a specific RV, the processor is configured to determine that all of the first TBs are disabled for an entirety of the N PDSCHs.

13. The device of claim 12, further comprising:

a transceiver configured to transmit or receive a radio signal under control of the processor, wherein the device is a user equipment (UE) based on the 3rd Generation Partnership Project (3GPP).

14. A method of transmitting a signal by a base station (BS) in a wireless communication system, the method comprising:

transmitting, through a single physical downlink control channel (PDCCH), downlink control information (DCI) for scheduling N physical downlink shared channels (PDSCHs); and transmitting the N PDSCHs based on the DCI, wherein the DCI includes (i) a first modulation and coding scheme (MCS) field for first transport blocks (TBs) of the N PDSCHs and (ii) a first redundancy version (RV) field including N bits each indicating an RV for each of the first TBs of the N PDSCHs, and wherein the BS informs a user equipment (UE) that all of the first TBs are disabled for an entirety of the N PDSCHs by setting the first MCS field for the first TBs of the N PDSCHs to a specific MCS and setting all of the N bits included in the first RV field for the first TBs of the N PDSCHs to only a specific RV.

15. A base station (BS) for wireless communication, the BS comprising:

a memory configured to store instructions; and a processor configured to perform operations by executing the instructions, wherein the operations performed by the processor comprise:

transmitting, through a single physical downlink control channel (PDCCH), downlink control information (DCI) for scheduling N physical downlink shared channels (PDSCHs); and transmitting the N PDSCHs based on the DCI, wherein the DCI includes (i) a first modulation and coding scheme (MCS) field for first transport blocks (TBs) of the N PDSCHs and (ii) a first redundancy version (RV) field including N bits each indicating an RV for each of the first TBs of the N PDSCHs, and wherein the processor is configured to informs a user equipment (UE) that all of the first TBs are disabled for an entirety of the N PDSCHs by setting the first MCS field for the first TBs of the N PDSCHs to a specific MCS and setting all of the N bits included in the first RV field for the first TBs of the N PDSCHs to only a specific RV.

* * * * *